United States Patent

Johnston

[15] 3,678,253

[45] July 18, 1972

[54] COMPUTING DEVICE

[72] Inventor: Reed H. Johnston, Wellesley, Mass.

[73] Assignee: Veeder Industries, Inc., Hartford, Conn.

[22] Filed: Aug. 17, 1970

[21] Appl. No.: 64,337

[52] U.S. Cl..................235/92 FL, 235/92 R, 235/92 PE, 235/92 CM, 235/94
[51] Int. Cl. .........................................................H03k 21/36
[58] Field of Search..............235/92 FL, 92 WT, 92 CC, 94

[56] References Cited

UNITED STATES PATENTS

| | | | |
|---|---|---|---|
| 3,081,031 | 3/1963 | Livesay | 235/92 FL |
| 3,064,889 | 11/1962 | Hupp | 235/92 CC |
| 3,205,956 | 9/1965 | Bell | 235/92 WT |

*Primary Examiner*—Daryl W. Cook
*Assistant Examiner*—Robert F. Gnuse
*Attorney*—Prutzman, Hayes, Kalb & Chilton

[57] ABSTRACT

A five product gasoline dispensing system having a cost counter for accumulating the cost of gasoline dispensed, five banks of price switches for the five gasoline products respectively settable for pre-establishing the amount of each place of the unit volume price for the respective product within a three place price range, a selector for selectively conditioning the system for dispensing each of the gasoline products and for activating the corresponding switch bank for establishing the unit volume price, and a pulse generating device adapted to generate pulse trains for the three places of the unit volume price having 5, 50, and 500 pulses respectively for each unit volume of a gasoline dispensed. A control circuit is operated by each pulse to preset a binary predetermining counter at the binary complement of the setting of the respective price switch and an oscillator is gated to index the predetermining counter from its preset count to a maximum count and simultaneously index the cost counter such that for each unit volume of gasoline dispensed the amounts of the three places of the established price are added to the cost counter 5, 50, and 500 times.

19 Claims, 1 Drawing Figure

PATENTED JUL 18 1972
3,678,253
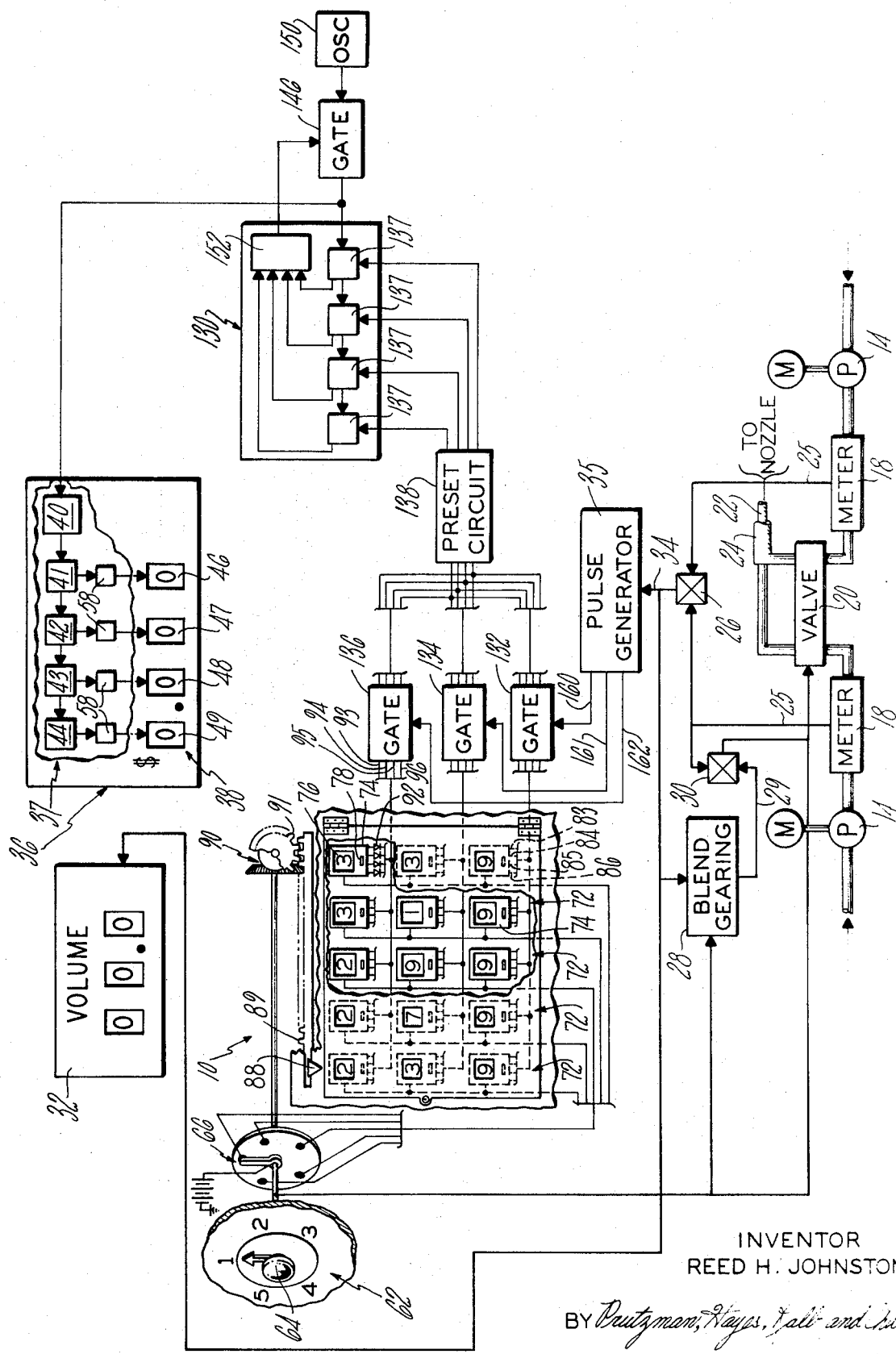
INVENTOR
REED H. JOHNSTON
BY Brutzman, Hayes, Kall and Sitor
ATTORNEYS

COMPUTING DEVICE

BRIEF SUMMARY OF THE INVENTION

The present invention relates to computing devices having notable utility in gasoline dispensing systems for computing the cost of gasoline dispensed in accordance with the volume dispensed and a unit volume price established by the setting of the computing device.

It is a primary aim of the present invention to provide a low cost electronic computing device for gasoline dispensing systems for computing the cost of gasoline dispensed.

It is another aim of the present invention to provide a new and improved computing device for accumulating the product of a pre-established multiplier and a second amount proportional to, for example, the rotation of a rotary input.

It is a further aim of the present invention to provide a new and improved electronic computing device for accumulating the product of a pre-established multiple place multiplier and a second variable amount.

It is another aim of the present invention to provide a new and improved computing device for multiple product fluid dispensing systems which provides for pre-establishing the unit volume price of each of the fluid products and which is adapted to be readily conditioned for computing the cost of fluid dispensed in accordance with each of the pre-established unit volume prices.

It is a further aim of the present invention to provide a new and improved electronic cost computer for fluid dispensing apparatus employing conventional and reliable logic components.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWING

In the drawing:

The FIGURE is a generally schematic view, partly broken away and partly in section, of a multiple product gasoline dispensing system incorporating an embodiment of the computing device of the present invention.

DESCRIPTION OF THE PREFERRED EMBODIMENT

Referring now in detail to the drawing wherein like parts are designated by like numerals, a multiple product gasoline dispensing system incorporating an embodiment 10 of a computing device of the present invention is shown comprising a pair of motor driven pumps 14 for delivering separate grades of gasoline to a dispensing nozzle (not shown) via a pair of fuel meters 18, a proportioning valve 20 and a pair of coaxial conduits 22, 24. The output shafts 25 of the meters 18 are connected to a summation differential 26 to drive suitable blend ratio gearing 28 in accordance with the total amount of fuel dispensed. In a conventional manner the rotation of output shaft 29 of blend gearing 28 is compared with the rotation of the output shaft 25 of one of the meters 18 by a subtraction differential 30 to control the proportioning valve 20 and thereby establish the blend proportions in accordance with the setting of the blend gearing 28.

The output of the summation differential 26 is also suitably connected for driving a volume counter 32 for registering the total volume of gasoline dispensed and to an input shaft 34 of a pulse generating device 35. A cost register 36 having a counter or accumulator 37 and a cost indicator 38 is connected to accumulate the cost of the fuel delivered in accordance with the total volume dispensed and a unit volume price (within a three place price range of the computing device 10) established by the setting of the computing device. The counter 37 is shown comprising an input counting section 40 and four decade sections 41–44 of increasing order, and the cost indicator 38 comprises four 0–9 digit indicators 46–49 which are suitably connected via decoder-driver circuits 58 to the decades 41–44 to provide a visual readout of the total cost of fuel delivered. Preferably the volume and cost counters 32, 36 are resettable and are connected to be reset to "0" before the commencement of each fuel delivery.

A product selector 62 having a rotatable selector knob 64 is provided for selecting each of the available fuel products— five products in the shown embodiment which for example may include each of the two separate grades of gasoline individually and three different blends of the two grades of gasoline. The five position knob 64 is connected to the blend gearing 28 and proportioning valve 20 for setting the dispensing system for delivering the selected product. The product selector knob 64 is also connected to operate a price selector switch 66 for conditioning the computing device 10 to compute the cost in accordance with a unit volume price pre-established for the selected product.

The computing device 10 comprises a bank 72 of three price decade switches 74 for each of the fuel products. For example, the price switches 74 may be BCD switches of the type shown and described in U. S. Pat. No. 3,445,636 of Joseph A. Richards entitled "Single Wheel Counter Circuit" and having a number wheel 76 providing a numerical readout of the binary switch position and suitable means such as a push button 78 for selectively setting the switch and number wheel. In a conventional manner the four output leads 83–86 of each binary switch have binary values of 1, 2, 4 and 8 respectively such that for example lead 83 would be energized when the number wheel 78 is set at "1", lead 84 would be energized when the number wheel is set at "2", leads 83 and 84 would be energized when the number wheel is set at "3", etc.

The banks 72 of price switches 74 are adapted to be set to pre-establish the unit volume prices for the fuel products and the switch banks 72 are connected to be individually activated by the price selector switch 66 in accordance with the position of the product selector knob 64. The switch banks 72 are preferably mounted to provide a convenient visual indication of all of the pre-established prices for the fuel products. Also the active bank of price switches 74 is preferably suitably indicated as by an index 88 mounted on a rack 89 and adapted to be positioned by the selector knob 64 through bevel gearing 90 and gear 91.

The price switches 74 for each place of the three place unit volume price are connected in parallel and are suitably isolated, as by the provision of diodes 92 in the output leads 83–86 of each switch 74, to prevent feedback through inactive switches such that the BCD signal in the output leads 93–96 for each place of the three place unit volume price is dependent upon the setting of the corresponding active price switch 74.

A predetermining counter 130 is adapted to be preset in accordance with the setting of each of the active price switches 74 by selective operation of "units" control gate 132, "tens" control gate 134, and "hundreds" control gate 136. The predetermining counter 130 is preferably a binary decade counter having four flip-flops 137 and is connected via a suitable preset circuit 138 to be set at the binary complement of the binary signal from the selected active price switch 74. Thus, if the binary signal from the active "hundreds" price switch 74 is 0010 (i.e., binary 2) the predetermining counter 130 will be preset at the binary complement of 0010 or 1101 when the "hundreds" control gate 136 is operated. Alternatively, a suitable price switch providing a complementary binary signal of the switch setting could be used to preset the predetermining counter 130 directly.

An oscillator 150 is provided for generating stepping or clocking pulses (for example, at a frequency of 100 KH), and a control gate 146 is provided for connecting the oscillator 150 for simultaneously stepping or pulsing the predetermining counter 130 and the cost counter 37. The flip-flops 137 of the predetermining counter 130 are connected via a suitable predetermining logic circuit 152 to the control gate 146 for disconnecting the oscillator when the binary counter 130 reaches its full capacity (i.e., 1111 or binary 15). Thus, for example, when the "hundreds" control gate 136 is operated to preset the predetermining counter 130 at the complement of binary 2, the control gate 146 will be "opened" momentarily to provide for pulsing the predetermining counter 130 and cost counter 37 two steps.

The predetermining counter 130 is therefore adapted to be cycled by operation of each of the control gates 132, 134, 136 to add a count to the cost counter 37 equal to the amount of the corresponding place of the established unit volume price.

The pulse generating device 35 has three output leads 160–162, one for each place of the three place price range, for operating the corresponding control gates 132, 134, 136. The pulse generating device generates three separate pulse trains of noncoincident pulses in the output leads 160–162, and having numbers of pulses for each unit volume (e.g., 1 gallon) of gasoline delivered in accordance with the relative weights of the corresponding places of the multiple place price range and therefore in the described embodiment in accordance with a geometrical progression having a common ratio of 10. For example, the pulse generating device provides for generating (a) five approximately equally spaced pulses (in the "units" lead 160) for each unit volume of gasoline delivered, (b) 50 substantially equally spaced pulses in the "tens" lead 161 for each unit volume of gasoline delivered, and (c) 500 substantially equally spaced pulses in the "hundreds" lead 162 for each unit volume of gasoline delivered—a total of 555 pulses for each unit volume of gasoline delivered. Each "units" pulse in lead 160 provides for operating the "units" control gate 132 to load the predetermining counter 130 and thereby index the cost counter 37 a number of times equal to the setting of the active "units" price switch 74. Such would occur 5 times for each unit volume of fuel delivered. Similarly each "tens" pulse in the lead 161 provides for operating the "tens" control gate 134, and each "hundreds" pulse in the lead 162 provides for operating the "hundreds" control gate 136 for respectively indexing the cost counter 37 a number of times equal to the setting of the active "tens" and "hundreds" price switches 74. The pulses in the three pulse trains are spaced and the response of the logic circuitry is suitably fast to permit each pulse to index the cost counter 37 before the succeeding pulse is generated. Therefore, for a unit volume price setting of, for example, 25.9 (e.g., 25.9 cents per gallon) the cost counter 37 will be stepped 1295 times for each unit volume of fuel delivered (i.e., 500×2 +50×5 +5×9) and be pulsed an approximately pro rata number of times for any remaining portion of a unit volume delivered.

The pulse generating device 35 may, for example, comprise three separate pulse generators operated directly by the pulse generator input shaft 34 to generate the three separate pulse trains. Alternatively, the input shaft 34 may, for example, be connected to generate a single pulse train and the pulse generating device may be provided with suitable logic circuitry operated by the single pulse train to generate the three separate pulse trains. Also, the "base" number of 5 "units" pulses for each unit volume of fuel may vary depending upon the accuracy desired.

The cost counter 37 is made suitably compatible with the pulse generating device 35 so that the indicator 38 is adapted to provide a readout of the actual cost of the fuel delivered to the desired place (e.g., tenths of a cent). Thus, using a "base" number of 5 "units" pulses per gallon, a gasoline price of 25.9 cents per gallon and an indicator 38 providing a readout to tenths of a cent, the input counting section 40 of the cost counter 37 would provide for dividing the total number of counts by 5 so as to index the lowest order decade 41 one step for each five input pulses to the cost counter 37. The lowest order decade 41 and indicator 38 would therefore be stepped 259 times (i.e., 1,295/5) in 0.001 or tenth cent increments to register an additional $0.259 (i.e., the price per gallon) for each gallon of fuel delivered. The cost indicator 38 therefore provides a readout of the total cost of gasoline delivered in accordance with the volume of gasoline delivered and the unit volume price pre-established for the fluid product being delivered.

As will be apparent to persons skilled in the art, various modifications, adaptations and variations of the foregoing specific disclosure can be made without departing from the teachings of the present invention.

I claim:

1. In a computing device for a fluid dispensing system having a cost accumulator operable for accumulating the cost of fluid dispensed and settable variating means connected for operating the cost accumulator in accordance with the volume of fluid dispensed and a multiple place unit volume price established by the setting of the variating means, the improvement wherein the variating means comprises a pulse generating device operable in accordance with the volume of fluid dispensed for producing a plurality of separate pulse trains for the multiple places respectively of the multiple place unit volume price having fixed relative numbers of pulses for each unit volume of fluid dispensed in accordance with a geometric progression having a common ratio of 10, accumulator indexing means presettable for establishing the amount of each place of the multiple place unit volume price and selectively operable for producing a separate burst of pulses for each place of the multiple place unit volume price having a number of pulses corresponding to the established amount of such place, the indexing means being connected to be separately operated by each pulse train for repetitively producing bursts of pulses for the respective place of the multiple place price for indexing the accumulator with the bursts of pulses for repetitively adding the established amount of the respective place of the multiple place price in accordance with the number of pulses in such pulse train.

2. In a computing device according to claim 1 wherein the indexing means comprises an electronic counter and circuit means selectively operable by each pulse train for setting the counter in accordance with the established amount of the respective place of the multiple place price and for producing a burst of pulses for the respective place for indexing the counter from such setting to a predetermined setting and for indexing the cost accumulator in accordance therewith for adding such amount to the accumulator.

3. In a computing device according to claim 2 wherein the electronic counter is a binary counter and wherein the circuit means is selectively operable for setting the counter at the binary complement of each of the established amounts of the multiple places of the multiple place unit volume price.

4. In a computing device according to claim 2 wherein the circuit means comprises a pulse source and a control gate operable for connecting the pulse source for producing a burst of pulses for simultaneously indexing the electronic counter and cost accumulator.

5. In a computing device according to claim 1 wherein the indexing means is presettable for establishing a coded electrical signal for each place of the multiple place unit volume price for establishing the amount thereof.

6. In a computing device according to claim 5 wherein the indexing means comprises a control gate for each place of the multiple place unit volume price operable by the respective pulse train for connecting the respective coded electrical signal for indexing the accumulator with the respective burst of pulses for repetitively adding the established amount of the respective place of the unit volume price.

7. In a computing device for a fluid dispensing system having a cost accumulator operable for accumulating the cost of fluid dispensed, and settable variating means connected to operate the cost accumulator in accordance with the volume of fluid dispensed and a unit volume price established by the setting of the variating means; the improvement wherein the variating means comprises unit volume price setting means presettable for establishing a plurality of separate coded electrical signals of different relative weights for encoding amounts establishing the unit volume price, and accumulator indexing means operable by each coded electrical signal for producing a separate burst of pulses having a number of pulses corresponding to the amount encoded by such signal and operable in accordance with the volume of fluid dispensed for repetitively indexing the accumulator with the bursts of pulses for repetitively adding the respective amount to the cost accumulator to increase the accumulated count in the cost accumulator in accordance with the relative weight of the respective electrical signal and the volume of fluid dispensed.

8. In a computing device according to claim 7 wherein the accumulator indexing means is operable for repetitively indexing the accumulator with bursts of pulses for each such amount for repetitively adding such amount to the cost accumulator a number of times in accordance with the relative weight of the respective electrical signal and the volume of fluid dispensed.

9. In a computing device according to claim 7 wherein the separate coded electrical signals are binary coded electrical signals.

10. In a computing device according to claim 7 wherein the indexing means comprises a settable counter, control means for each of said electrical signals adapted to be repetitively operated in accordance with the volume of fluid dispensed for connecting the electrical signal for setting the counter in accordance with the amount encoded thereby and stepping means for producing a burst of pulses for stepping the counter and cost accumulator simultaneously until the counter reaches a predetermined count.

11. In a computing device according to claim 7 wherein the coded electrical signals have different relative weights in accordance with a geometric progression having a common ratio of 10 and the amounts encoded thereby establish the multiple places respectively of a multiple place unit volume price.

12. A computing device for accumulating the product of a first amount proportional to a first input and a pre-established multiplier comprising multiplier setting means for setting a plurality of separate coded electrical signals of amounts of different relative weights collectively establishing a multiplier, electrical pulse generating means connected to be operated by the first input to generate a plurality of pulse trains for the plurality of coded signals respectively having fixed relative numbers of pulses corresponding to the relative weights of the respective encoded amounts, a product accumulator operable for accumulating a count of the product of the first amount and the established multiplier, and indexing means operable by each coded electrical signal for producing a separate burst of pulses having a number of pulses corresponding to the amount encoded by such signal and operable by each pulse train for indexing the cost accumulator with a burst of pulses for the respective electrical signal for repetitively adding the amount established by each coded price signal to the product accumulator a number of times in accordance with the number of pulses in the corresponding pulse train.

13. A computing device according to claim 12 wherein the indexing means comprises a settable counter, stepping means for producing a burst of pulses for automatically stepping the counter from its set count to a final count and for stepping the product accumulator the same number of counts, and sequencing means operated by the pulse trains for repetitively setting the counter in accordance with the amounts established by the corresponding coded signals respectively.

14. A computing device according to claim 12 wherein the multiplier setting means comprises a plurality of separate decade switches of increasing order for setting separate coded electrical signals of amounts of places of increasing order respectively of a multiple place multiplier.

15. A computing device according to claim 12 wherein the multiplier setting means comprises a plurality of settable switches for respectively setting a plurality of separate binary coded electrical signals.

16. A computing device according to claim 12 wherein the amounts have relative weights in accordance with a geometric progression.

17. A computing device according to claim 16 wherein the geometric progression has a common ratio of 10.

18. In a computing device for a multiple product fluid dispensing system having a cost accumulator operable for accumulating the cost of fluid dispensed, settable variating means connected for operating the cost accumulator in accordance with the volume of fluid dispensed and a unit volume price established by the setting of the variating means, presettable means presettable for programming the setting of the variating means and therefore the unit volume price of each of the fluid products and setting means selectively operable for selectively conditioning the apparatus for dispensing the fluid products and for setting the variating means and therefore the unit volume price in accordance with the corresponding setting of the presettable means, the improvement wherein the presettable means comprises a plurality of encoders for the plurality of fluid products respectively each settable for establishing a plurality of coded price signals of amounts of different relative weights collectively establishing a unit volume price, wherein the setting means is operable for selectively activating the encoders for establishing the unit volume price, and wherein the variating means comprises accumulator indexing means operable by each coded price signal of the active encoder for producing a separate burst of pulses for each signal having a number of pulses corresponding to the amount encoded by such signal and operable in accordance with the volume of fluid dispensed for repetitively producing such bursts of pulses and operating the cost accumulator with such bursts of pulses for repetitively adding a count corresponding to the amount encoded by such price signal for increasing the accumulated count in accordance with the relative weight of such amount and the volume of fluid dispensed.

19. In a computing device according to claim 18 wherein the accumulator indexing means is operable by each coded price signal to produce a burst of pulses to operate the cost accumulator to add a count equal to the amount encoded by such price signal.

* * * * *